United States Patent
Dove

(10) Patent No.: US 9,071,373 B2
(45) Date of Patent: Jun. 30, 2015

(54) MULTIPLEXED SERIAL MEDIA INDEPENDENT INTERFACE

(75) Inventor: Daniel J. Dove, Colfax, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 329 days.

(21) Appl. No.: 13/697,101

(22) PCT Filed: Jun. 1, 2010

(86) PCT No.: PCT/US2010/036831
§ 371 (c)(1),
(2), (4) Date: Nov. 9, 2012

(87) PCT Pub. No.: WO2011/152818
PCT Pub. Date: Dec. 8, 2011

(65) Prior Publication Data
US 2013/0060979 A1    Mar. 7, 2013

(51) Int. Cl.
*H04L 12/40* (2006.01)
*H04J 3/04* (2006.01)
*H04L 29/10* (2006.01)
*H04L 29/06* (2006.01)

(52) U.S. Cl.
CPC ............... *H04J 3/047* (2013.01); *H04L 29/10* (2013.01); *H04L 12/40136* (2013.01); *H04L 69/14* (2013.01)

(58) Field of Classification Search
CPC . G06F 13/385; H04L 29/06; H04L 12/40136; H04L 12/46; H04L 69/14
USPC ............ 710/52, 104, 305; 370/463, 469
See application file for complete search history.

(56) References Cited

U.S. PATENT DOCUMENTS

| 6,385,208 | B1 | 5/2002 | Findlater et al. |
| 7,042,893 | B1* | 5/2006 | Lo et al. ............... 370/419 |
| 2002/0178291 | A1* | 11/2002 | Senthil et al. ............ 709/248 |
| 2003/0099253 | A1 | 5/2003 | Kim |

(Continued)

FOREIGN PATENT DOCUMENTS

KR    100645518    11/2006

OTHER PUBLICATIONS

Serial-MII Specification, Revision 2.1; Cisco Systems, Inc.; Feb. 9, 2000.*

(Continued)

*Primary Examiner* — Glenn A Auve
(74) *Attorney, Agent, or Firm* — Brooks, Cameron & Huebsch

(57) ABSTRACT

Systems, methods, and devices are provided for a multiplexed serial media independent interface (110-1, 110-N, 210). One system for handling data includes a physical layer (PHY) circuit (102-1, 102-N, 202-1, 202-N) operating at a first rate including a number of ports (104-1, 104-P), a media access control (MAC) circuit (108, 208-1, 208-N) operating at the first rate including a number of ports, and a multiplexed serial media independent interface (110-1, 110-N, 210) between the MAC circuit (108, 208-1, 208-N) and the PHY circuit (102-1, 102-N, 202-1, 202-N) operating at a second rate, which is greater than the first rate. The interface (110-1, 110-N, 210) includes a number of conductors and is configured to communicate data between the MAC circuit (108, 208-1, 208-N) and the PHY circuit (102-1, 102-N, 202-1, 202-N) via four conductors per up to eight ports (104-1, 104-P) of the PHY circuit (102-1, 102-N, 202-1, 202-N).

15 Claims, 2 Drawing Sheets

(56) References Cited

U.S. PATENT DOCUMENTS

2004/0125809 A1    7/2004  Jeng
2008/0069144 A1    3/2008  Yu et al.
2013/0163609 A1*   6/2013  Iima .............................. 370/419

OTHER PUBLICATIONS

SMII—Serial MII Ethernet interface; ORSoC and OpenCores; 2009.*

ISR/WO, PCT/US2010/036831, Feb. 25, 2011.

* cited by examiner

MULTIPLEXED SERIAL MEDIA INDEPENDENT INTERFACE

BACKGROUND

In network devices (e.g., switches), production cost may be impacted significantly by the number of conductors (e.g., pins) used on integrated circuits (ICs) within a network device, and the number of signals routed on circuits (e.g., printed circuit boards (PCBs)). For example, a Media Independent Interface (MII) including 24 ports operating at 10 megabits per second (Mbps) and/or 100 Mbps (10/100) Ethernet interfacing between a media access control (MAC) circuit and physical layer (PHY) circuit may include 384 pins. Other interfaces may operate at one gigabit per second (Gbps) or faster.

Newer interfaces that reduce the number of pins have been developed such as the Reduced Media Independent Interface (RMII), Serial Media Independent Interface (SMII), and Serial Gigabit Media Independent Interface (SGMII). An RMII may use eight pins per port such that a 24 port switch could include 192 pins for interfacing between the MAC and the PHY circuits. An SMII may include four pins per port, so a 24 port switch could include 96 pins, plus four additional clock signals. An SGMII (e.g., 10/100/1000 Mbps) may be designed for single ports and use four pins per PHY resulting in 96 pins for 24 ports.

A MAC may be located within a semiconductor device or "chip." One function of a MAC may be to communicate data over a physical medium (e.g., an optical fiber or a conductive wire). In other words, the MAC may be the interface between the physical medium and the higher layer functions in a device (e.g., an operating system, routing function, etc.). The MAC may communicate with other devices (e.g., other PHY circuits) located on remote chips through the use of a serializer/deserializer (SerDes) device that converts parallel data from the MAC into serial data for transmission over the physical medium. The SerDes may also convert received serial data into parallel data for use with its associated MAC.

DETAILED DESCRIPTION

Figure 1:
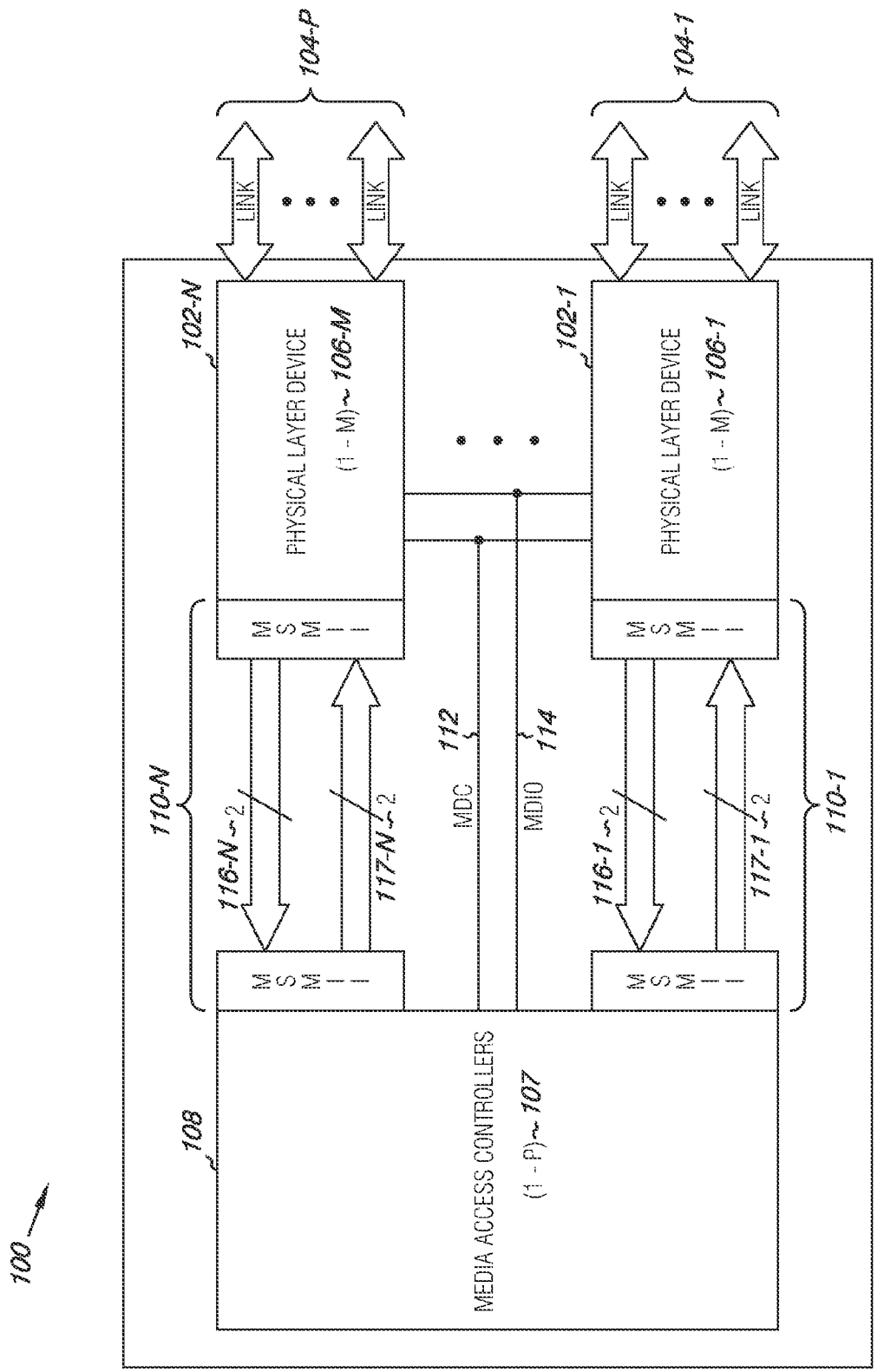
FIG. 1 is a schematic illustrating a system for handling data, according to one or more embodiments of the present disclosure.

Systems, methods, and devices are provided for a multiplexed serial media independent interface. One system for handling data includes a physical layer (PHY) circuit operating at a first rate including a number of ports, a media access control (MAC) circuit operating at the first rate including a number of ports, and a multiplexed serial media independent interface between the MAC circuit and the PHY circuit operating at a second rate, which is greater than the first rate. The interface includes a number of conductors and is configured to communicate data between the MAC circuit and the PHY circuit via four conductors per up to eight ports of the PHY circuit.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 208-1, . . . , 208-N in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense. As used herein, "a number of" something can refer to one or more such things.

As used herein, the designators "N," "M," and "P," particularly with respect to reference numerals in the drawings, indicate that a number of the particular feature so designated can be included with one or more embodiments of the present invention. The designators can represent the same or different numbers of the particular features.

One or more embodiments of the present disclosure can provide a system for communicating data serially between one or more MAC circuits and a corresponding one or more PHY circuits at rates faster than a rate at which the PHY circuit communicates data external to the system. For example, the PHY circuit and/or the MAC circuit may operate at rates of 10 or 100 Mbps and an interface between the PHY circuit and the MAC circuit can communicate data at a rate of at least 1000 Mbps.

The present disclosure can provide for such communication between a Multiport MAC (MMAC) circuit and a Multiport PHY (MPHY) circuit using four conductors (e.g., pins) per up to eight ports and/or channels for the PHY circuit and/or the MAC circuit. Significantly reducing the number of pins (e.g., as compared to some previous approaches) can reduce power consumption and cost and can improve layout of a system by reducing the number of signals used between circuits. In one or more embodiments such a system can be a network switch.

Embodiments of the present disclosure may include systems for handling data. Such systems can be a network device such as a switch. Such network devices can include a processor in communication with a memory and may include network chips having hardware logic (e.g., in the form of application specific integrated circuits (ASICs)), associated with a number of network ports. Devices in a network are not limited to a number of ports, network chips and/or the type or size of processor or memory resources.

As one of ordinary skill in the art will appreciate, each network device in a network can be physically associated with a port of a switch to which it is connected. Information in the form of packets can be passed through the network. Users can physically connect to the network through ports on the network device (e.g., switch). Data frames, or packets, can be transferred between network devices by means of a network device's (e.g., switch's) logic link control (LLC)/media access control (MAC) circuitry, or "engines", as associated with ports on a network device. A network switch forwards packets received from a transmitting network device to a destination network device based on the header information in received packets. A network device can also forward packets from a given network to other networks through ports on one or more other network devices. As the reader will appreciate an Ethernet network is described herein. However, embodiments are not limited to use in an Ethernet network, and may be equally well suited to other network types (e.g., asynchronous transfer mode (ATM) networks, etc).

As used herein, a network can provide a communication system that links two or more computers and peripheral devices, allows users to access resources on other computers, and exchange messages with other users. A network allows users to share resources on their own systems with other network users and to access information on centrally located systems or systems that are located at remote offices. It may provide connections to the Internet or to the networks of other organizations. Users may interact with network-enabled software applications to make a network request, such as to get a file or print on a network printer. Applications may also communicate with network management software, which can interact with network hardware to transmit information between devices on the network.

FIG. 1 is a schematic illustrating a system 100 for handling data, according to one or more embodiments of the present disclosure. System 100 for handling data can operate according to an Ethernet networking standard, as will be understood by one of ordinary skill in the art. In one or more embodiments, the system 100 can be a network switch. The system 100 includes a number of physical layer (PHY) circuits 102-1, ..., 102-N. "Physical layer" can refer to the physical layer of the Open System Interconnection Reference Model (OSI model), as will be appreciated by one of ordinary skill in the art. The PHY circuits 102-1, ..., 102-N can be individual chips, can be integrated on a single PHY chip, or can be integrated with the system 100 on a single chip such as a system-on-a-chip (SoC).

Each of the PHY circuits 102-1, ..., 102-N can include a number of ports 104-1, ..., 104-P respectively. For example, each PHY circuit can include eight ports. The ports 104-1, ..., 104-P for each PHY 102-1, ..., 102-N can be connected to a number of physical mediums such as twisted pair, copper wire, optical fibers, etc. for communication of data outside of the system 100. Such data communication can correspond to the data link layer of the OSI model. Each of the PHY circuits 102-1, ..., 102-N can include a number of channels 106-1, ..., 106-M respectively. The number of channels 106-1, ..., 106-M for each PHY circuit 102-1, ..., 102-N can be the same or different than the number of ports for each PHY circuit 102-1, ..., 102-N.

The PHY circuits 102-1, ..., 102-N can be connected to a number of media access control (MAC) circuits 108 via a number of interfaces 110-1, ..., 110-N. Although FIG. 1 illustrates the MAC circuits 108 as a single chip, embodiments are not so limited and the MAC circuits 108 can include more than one chip. The MAC circuits 108 can include a number of channels 107. In one or more embodiments, the number of channels 107 included in the MAC circuits 108 can be equal to the number of channels 106-1, ..., 106-M included in the PHY circuits 102-1, ..., 102-N in the system 100. The channels 107 included in the MAC circuits 108 and the channels 106-1, ..., 106-M included in the PHY circuits 102-1, ..., 102-N can be used to communicate data between the MAC circuits 108 and the PHY 102-1, ..., 102-N circuits via the interfaces 110-1, ..., 110-N.

The interfaces 110-1, ..., 110-N can be multiplexed serial media independent interfaces (MSMII). In general, a media independent interface (MII) can be used to connect different types of PHY circuits to a common MAC circuit. Each MSMII 110-1, ..., 110-N can include a first differential signal communicated via a first pair of conductors 116-1, ..., 116-N to transmit data from the PHY circuits 102-1, ..., 102-N to the MAC circuits 108 and a second differential signal communicated via a second pair of conductors 117-1, ..., 117-N to transmit data from the MAC circuits 108 to the PHY circuits 102-1, ..., 102-N. Each differential signal can include a positive polarity portion and a negative polarity portion. Accordingly, each MSMII 110-1, ..., 110-N can include four pins that correlate to (e.g., can be used to transmit and/or receive) the four signals (e.g., the positive and negative polarity portions of the two differential signals).

The differential signals can be low voltage (e.g., 3.3 volt) signals conveyed with positive logic such that a signal is at a logic "high" (e.g., "1") when the positive signal of the differential pair is at a voltage level greater than the negative signal of the differential pair. The signal can be at a logic "low" (e.g., "0") when the positive signal of the differential pair is at a voltage less than the negative signal of the differential pair.

The PHY circuits 102-1, ..., 102-N, the MAC circuits 108, and the interfaces 110-1, ..., 110-N can be configured to operate at a number of rates. For example, the PHY circuits 102-1, ..., 102-N and the MAC circuits 108 can be configured to operate at a first rate (e.g., 10 Mbps) and the interfaces 110-1, ..., 110-N can be configured to operate at a second rate (e.g., 100 Mbps). The PHY circuits 102-1, ..., 102-N, MAC circuits 108, and interfaces 110-1, ..., 110-N can operate at the same rate or at different rates from one another. In one or more embodiments, the PHY circuits 102-1, ..., 102-N and the MAC circuits 108 can be configured to operate at a first rate and the interfaces 110-1, ..., 110-N can be configured to operate at a second rate greater than the first rate.

The system 100 can include a management data clock (MDC) signal 112 for communicating data via a management interface between the MAC circuits 108 and the PHY circuits 102-1, ..., 102-N. The management data clock can be a reference clock for the MAC circuits 108. In one or more embodiments, the reference clock for the MAC circuits 108 can be used to generate the second differential signal and/or used to generate timing of the first differential signal. The system 100 can also include a management data input/output (MDIO) signal 114 for communicating via the management interface between the MAC circuits 108 and the PHY circuits 102-1, ..., 102-N. The PHY circuits 102-1, ..., 102-N can be configured to synchronize data communications with a clock signal (e.g., management data clock signal 112) from the MAC circuits 108.

Figure 2:
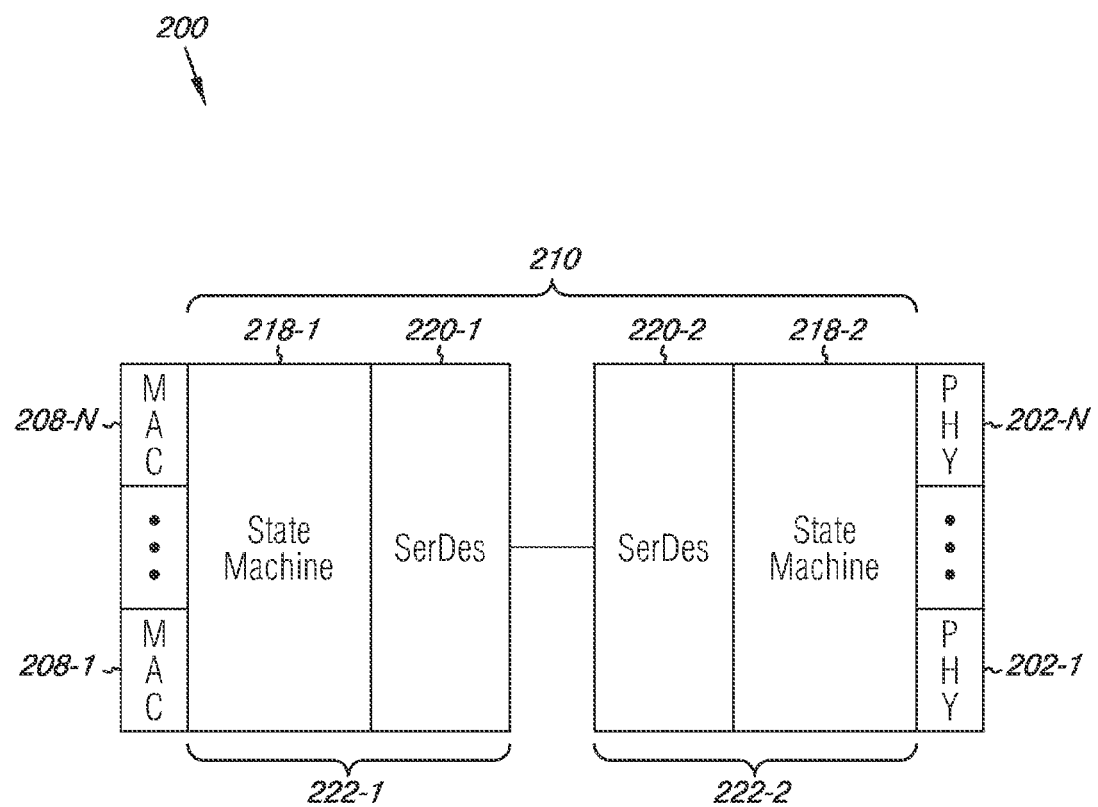
FIG. 2 is a schematic illustrating portions of a system for handling data, according to one or more embodiments of the present disclosure.

FIG. 2 is a schematic illustrating portions of a system 200 for handling data, according to one or more embodiments of the present disclosure. The system 200 can include a number of PHY circuits 202-1, ..., 202-N, a number of MAC circuits 208-1, ..., 208-N, and a number of interfaces (e.g., MSMII) 210. The system 200, PHY circuits 202-1, ..., 202-N, MAC circuits 208-1, ..., 208-N, and interfaces 210 can be analogous to the system 100, PHY circuits 102-1, ..., 102-N, MAC circuits 108, and interfaces 110-1, ..., 110-N illustrated in FIG. 1 respectively.

The system 200 illustrated in FIG. 2 includes additional detail with respect to the interfaces 210. The interfaces 210 can include interface components 222-1 and 222-2 associated with the MAC circuits 208-1, ..., 208-N and the PHY circuits 202-1, ..., 202-N respectively. The interface components 222-1, 222-2 can function as transmit components and/or receive components of the interfaces 210. For example, when the PHY circuits 202-1, ..., 202-N transmit data to the MAC circuits 208-1, ..., 208-N, the interface component 222-2 associated with the PHY circuits 202-1, ..., 202-N can function as a transmit component and the interface component 222-1 associated with the MAC circuits 208-1, ..., 208-N can function as a receive component. Likewise, when the MAC circuits 208-1, ..., 208-N transmit data to the PHY circuits 202-1, ..., 202-N, the interface component 222-1 can function as a transmit component and the interface component 222-2 can function as a receive component.

Each interface component 222-1, 222-2 can include a state machine 218-1, 218-2 and a serializer/deserializer (SerDes) circuit 220-1, 220-2 respectively. The interfaces 210 and/or interface components 222-1, 222-2 can include additional circuits, components, and/or functionality not specifically illustrated in FIG. 2.

In one or more embodiments, the interfaces 210 can be configured to encode data transmitted via the interfaces 210 (e.g., using a state machine 218-1, 218-2). For example, the data can be encoded using 8b/10b encoding into groups of data symbols. At least one data symbol from each of the number of channels can be included in a group of data symbols. For embodiments using eight channels, a group of eight data symbols can include one data symbol from each of the eight channels. For embodiments using fewer than eight channels, a group of eight data symbols can include at least one symbol from each channel plus a number of repeated data symbols up to eight data symbols total. The interfaces can add one or more control sets to a group of data symbols of encoded data (e.g., using a state machine 218-1, 218-2). For example, one control set can be added for every eight data symbols. In one or more embodiments, the control set can include two symbols including a particular starter symbol indicating that the interfaces 210 are operating as multiplexed serial media independent interfaces and a channel symbol indicating status and the number of channels being communicated (e.g., one control set including two symbols can be added for every eight data symbols).

The particular starter symbol can be unique to multiplexed serial media independent interfacing. The particular channel symbol can include eight defined bits. A first bit can indicate whether a receive component has established a valid link with the interface. A second bit can indicate whether a remote interface is operational. A third bit can indicate whether a local device is operational. A fourth bit can be reserved for other indications. Thus, the first four bits can indicate status. However, embodiments are not limited to a particular ordering of the bits. The channel symbol can include four additional bits that can be used to indicate the number of channels being communicated. For embodiments including one control set per eight data symbols, a data rate "gear ratio" of 1.25:1 can be provided. For example, encoding data that has an original rate of 100 Mbps, using 8b/10b encoding, can yield an effective rate of 125 Mbps ((100*10)/8=125). Thus, eight channels of data can be encoded, have a control set added, and be multiplexed from eight channels at 100 Mbps to a serial stream data rate of 1.25 Gbps.

Table 1 illustrates an example of eight channels of data having an original rate of 100 Mbps encoded with 8b/10b encoding and a serial stream resulting from multiplexing the eight channels. The first eight rows of Table 1 illustrate eight channels having data symbols "S" denoted by a first number indicating the channel number (e.g., from 0 to 7) and a subscript number indicating the symbol number within the channel (e.g., from 1 to 8). The ninth row illustrates the multiplexed serial data stream including control symbols "C" and data symbols "S".

TABLE 1

| | | | | | | | | | | | | | | | | | | |
|---|---|---|---|---|---|---|---|---|---|---|---|---|---|---|---|---|---|---|
| | | | | | $S0_1$ | | | | | | | | $S0_2$ | ... | $S0_8$ | | | |
| | | | | | $S1_1$ | | | | | | | | $S1_2$ | ... | $S1_8$ | | | |
| | | | | | $S2_1$ | | | | | | | | $S2_2$ | ... | $S2_8$ | | | |
| | | | | | $S3_1$ | | | | | | | | $S3_2$ | ... | $S3_8$ | | | |
| | | | | | $S4_1$ | | | | | | | | $S4_2$ | ... | $S4_8$ | | | |
| | | | | | $S5_1$ | | | | | | | | $S5_2$ | ... | $S5_8$ | | | |
| | | | | | $S6_1$ | | | | | | | | $S6_2$ | ... | $S6_8$ | | | |
| | | | | | $S7_1$ | | | | | | | | $S7_2$ | ... | $S7_8$ | | | |
| C1 | C2 | $S0_1$ | $S1_1$ | $S2_1$ | $S3_1$ | $S4_1$ | $S5_1$ | $S6_1$ | $S7_1$ | C1 | C2 | $S1_2$ | $S2_2$ | ... | $S5_8$ | $S6_8$ | $S7_8$ | |

An example of eight channels of data having an original rate of 10 Mbps encoded with 8b/10b encoding and a serial stream resulting from multiplexing the eight channels can be similar to that illustrated in the example associated with Table 1 and an original 100 Mbps stream, except that each symbol can be repeated ten times to bring the overall serial stream to 1 Gbps.

Multiplexing of the encoded data (e.g., including the added control sets) can be achieved with time division multiplexing (e.g., using a SerDes 220-1, 220-2) of encoded data from the number of channels. For embodiments in which the PHY circuits 202-1, . . . , 202-N and/or MAC circuits 208-1, . . . , 208-N operate at a first rate less than a second rate at which the interfaces 210 operate and in which the PHY circuits 202-1, . . . , 202-N include a number of ports (e.g., ports 104-1, . . . , 104-P illustrated in FIG. 1) greater than one, the interfaces 210 can multiplex data from a number of channels (e.g., channels 106-1, . . . , 106-M, 107 illustrated in FIG. 1) at the first rate to a serial data stream at the second rate. For example, the interfaces 210 can multiplex data from the PHY circuits 202-1, . . . , 202-N and the MAC circuits 208-1, . . . , 208-N, which can operate at 10/100 Mbps, to a serial stream at 1.25 Gbps.

A transmit component (e.g., component 222-2) of the interfaces 210 can be configured to multiplex data (e.g., via SerDes 220-2) for transmit circuits (e.g., PHY circuits 202-1, . . . , 202-N) operating more than one channel at a rate less than a rate of the interfaces 210. The transmit component can multiplex data from a first rate (e.g., the rate of the transmit circuit, such as the PHY circuits 202-1, . . . , 202-N and/or the MAC circuits 208-1, . . . , 208-N when either is transmitting) to a second rate (e.g., the rate of the interfaces 210) by transmitting the control set followed by a first data symbol from a first channel and a second data symbol from a second channel, etc. at the second rate. For example, the transmit circuit can transmit a control set and eight data symbols (e.g., one from each of eight channels) multiplexed from 100 Mbps to create a frame to be transmitted in a serial stream via the interfaces 210 at 1.25 Gbps. The control set can include a particular starter symbol and a channel symbol as described herein.

A receive component (e.g., component 222-1) of the interfaces 210 can be configured to demultiplex the received encoded data from the serial stream at the second rate to a number of channels at the first rate in response to the control set including the particular starter symbol indicating that the serial stream is a multiplexed serial media independent interface transmission and the channel symbol indicating status and transmission of more than one channel (multiplexed into a serial stream).

A transmit component (e.g., component 222-2) of the interfaces 210 can be configured to serialize data (e.g., via SerDes 220-2) for transmit circuits (e.g., PHY circuits 202-1, . . . , 202-N) operating one channel at a rate less than a rate of the interfaces 210. The transmit component can serialize data from a first rate (e.g., the rate of the transmit circuit) to a second rate (e.g., the rate of the interfaces 210) by repeating data (e.g., data symbols when the data being transmitted is encoded) a sufficient number of times such that a frame of data can be transmitted at the second rate. For example, the transmit circuit can repeat a data symbol ten times from a transmit circuit at 100 Mbps to create a frame to be transmitted via the interfaces 210 at a rate of at least 1 Gbps.

A receive component (e.g., component 222-1) of the interfaces 210 can be configured to deserialize the received encoded data from the serial stream at the second rate to one channel at the first rate in response to the control set including the particular starter symbol indicating that the serial stream is a multiplexed stream serial media independent interface transmission and the channel symbol indicating status and transmission of a single channel (in a serial stream).

A transmit component (e.g., component 222-2) of the interfaces 210 can be configured to pass data through the interfaces 210 without multiplexing for transmit circuits (e.g., PHY circuits 202-1, . . . , 202-N) operating a single channel at a rate equal to a rate of the interfaces 210. For example, for embodiments including the interfaces 210 and the PHY circuits 202-1, . . . , 202-N and the MAC circuits 208-1, . . . , 208-N operating at a rate of at least one Gbps, a transmit component (e.g., component 222-2) can pass data from the PHY circuits 202-1, . . . , 202-N to the MAC circuits 208-1, . . . , 208-N via the interfaces 210 without multiplexing the data.

A receive component (e.g., component 222-1) of the interfaces 210 can be configured to receive the data from the serial stream without demultiplexing in response to an absence of the particular starter symbol with the received data. The received serial data stream can be at a rate equivalent to a rate of the PHY circuit 202-1, . . . , 202-N, the MAC circuit 208-1, . . . , 208-N, and the interfaces 210.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system for handling data, comprising:
   a physical layer (PHY) circuit operating at a first rate, wherein the PHY circuit includes a number of ports;
   a media access control (MAC) circuit operating at the first rate, wherein the MAC circuit includes a number of ports; and
   a multiplexed serial media independent interface between the MAC circuit and the PHY circuit operating at a second rate greater than the first rate, wherein the interface includes a number of conductors;
   wherein the interface is configured to communicate data between the MAC circuit and the PHY circuit via four conductors per up to eight ports of the PHY circuit.

2. The system of claim 1, wherein the interface is configured to:
   encode data communicated via the interface;
   add one or more control sets to the encoded data; and
   time division multiplex the encoded data from a number of channels at the first rate to a serial stream at the second rate when the number of ports is greater than one.

3. The system of claim 2, wherein:
   the interface includes a transmit component and a receive component; and
   the one or more control sets include a particular starter symbol indicating a multiplexed serial data stream and a channel symbol indicating status and the number of channels in the serial data stream.

4. The system of claim 3, wherein the receive component is configured to demultiplex the encoded data from the serial stream at the second rate to the number of channels at the first rate in response to the one or more control sets including the particular starter symbol and the channel symbol indicating status and the number of channels in the serial data stream.

5. The system of claim 4, wherein the first rate is 100 megabits per second and the second rate is 1.25 gigabits per second.

6. The system of claim 3, wherein the receive component is configured to deserialize the encoded data from the serial stream at the second rate to one channel at the first rate in response to the one or more control sets including the particular starter symbol and the channel symbol indicating status and the number of channels comprises one channel.

7. The system of claim 3, wherein:
   the particular channel symbol comprises eight bits including:
      a first bit indicating whether the receive component has established a valid link;
      a second bit indicating whether a remote interface is operational;
      a third bit indicating whether a local device is operational;
      a fourth bit reserved; and
      four bits indicating the number of channels.

8. The system of claim 2, wherein the interface is configured to add one control set per eight data symbols; and
   wherein the interface is configured to encode the data using 8b/10b encoding.

9. The system of claim 8, wherein the eight data symbols include at least one data symbol from each of the number of channels; and
   wherein the eight data symbols include at least one data symbol from a particular channel of the number of channels and a repeat of the at least one symbol from the particular channel when the number of channels is more than two and less than eight.

10. The system of claim 1, wherein:
the MAC circuit and the PHY circuit are configured to operate at the second rate;
the interface includes a transmit component and a receive component;
the transmit component is configured to transmit the data without multiplexing; and
the receive component is configured to receive the data without demultiplexing in response to an absence of a particular starter symbol.

11. The system of claim 10, wherein the second rate is at least one gigabit per second.

12. The system of claim 1, wherein the four conductors communicate two differential signals including:
a first differential signal to transmit the data from the PHY circuit to the MAC circuit; and
a second differential signal to transmit data from the MAC circuit to the PHY circuit.

13. The system of claim 12, wherein the system includes:
a management data clock signal for communicating via a management interface between the MAC circuit and the PHY circuit;
a management data input/output signal for communicating via a the management interface between the MAC circuit and the PHY circuit; and
wherein the PHY circuit is configured to synchronize data transmissions with the management data clock signal from the MAC circuit.

14. A method for handling data, comprising:
operating a physical layer (PHY) circuit at a first rate, wherein the PHY circuit includes a number of ports;
operating a media access control (MAC) circuit at the first rate; and
communicating data with a multiplexed serial media independent interface including a number of conductors between the MAC circuit and the PHY circuit at a second rate greater than the first rate;
wherein the number of conductors comprises four conductors per up to eight ports of the PHY circuit.

15. The method of claim 14, wherein the method includes:
encoding data communicated via the interface;
adding one or more control sets to the encoded data; and
time division multiplexing the encoded data from a number of channels at the first rate to a serial stream at the second rate when the number of ports is greater than one.

* * * * *

UNITED STATES PATENT AND TRADEMARK OFFICE
CERTIFICATE OF CORRECTION

| | | |
|---|---|---|
| PATENT NO. | : 9,071,373 B2 | Page 1 of 1 |
| APPLICATION NO. | : 13/697101 | |
| DATED | : June 30, 2015 | |
| INVENTOR(S) | : Daniel Dove | |

It is certified that error appears in the above-identified patent and that said Letters Patent is hereby corrected as shown below:

Claims

In column 10, line 2, in Claim 13, delete "a the" and insert -- the --, therefor.

Signed and Sealed this
Twenty-fourth Day of November, 2015

Michelle K. Lee
*Director of the United States Patent and Trademark Office*